(12) United States Patent
Sipolins et al.

(10) Patent No.: US 12,717,533 B1
(45) Date of Patent: Aug. 25, 2026

(54) SYSTEMS AND METHODS FOR IMPROVING CONTENT ITEM OUTPUT

(71) Applicant: Adeia Guides Inc., San Jose, CA (US)

(72) Inventors: Aldis Sipolins, Somerville, MA (US); Tao Chen, Palo Alto, CA (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 19/255,259

(22) Filed: Jun. 30, 2025

(51) Int. Cl.

| | |
|---|---|
| ***G06F 3/14*** | (2006.01) |
| ***G06F 3/01*** | (2006.01) |
| ***G06T 3/40*** | (2006.01) |
| ***G06T 3/60*** | (2006.01) |
| ***G06V 40/16*** | (2022.01) |
| ***G06V 40/20*** | (2022.01) |

(52) U.S. Cl.
CPC ................ *G06F 3/14* (2013.01); *G06F 3/012* (2013.01); *G06F 3/013* (2013.01); *G06T 3/40* (2013.01); *G06T 3/60* (2013.01); *G06V 40/174* (2022.01); *G06V 40/20* (2022.01)

(58) Field of Classification Search
CPC ............ G06F 3/14; G06F 3/012; G06F 3/013; G06V 40/174; G06V 40/20; G06T 3/40; G06T 3/60
USPC .......................................................... 345/156
See application file for complete search history.

(56) References Cited

U.S. PATENT DOCUMENTS 7,898,429 B2 3/2011 Hwang et al.
9,508,160 B2 11/2016 Hewitt et al.
9,703,837 B1 * 7/2017 Teng ................. G06F 16/24578
10,101,806 B2 10/2018 Hsu et al.
12,313,936 B1 * 5/2025 Strandborg ......... G02F 1/13471
2002/0149613 A1 10/2002 Gutta et al.
2006/0007191 A1 1/2006 Chi et al.
2006/0071135 A1 4/2006 Trovato
(Continued)

FOREIGN PATENT DOCUMENTS

WO 2012/102828 A1 8/2012

OTHER PUBLICATIONS

Apple, "Recognizing People in Photos Through Private On-Device Machine Learning", Computer Vision, available online at: <https://machinelearning.apple.com/research/recognizing-people-photos>, Jul. 28, 2021, 12 pages.
(Continued)

*Primary Examiner* — Nathan P Brittingham
(74) *Attorney, Agent, or Firm* — HG LAW LLP

(57) ABSTRACT

Systems and methods are provided for improving content output. Content is displayed, and it is determined that at least one user is engaging with the content. A position of each user relative to a display is determined for each of the users, and priority values are determined based on a characteristic associated with each of the users engaging with the content. Metadata associated with the display is accessed, and a preferred output position for the display is determined based on the priority value for the each of the users and the metadata. At least one positioning element configured to guide a change in a position of the display in three-dimensional space is displayed based on the preferred output position. The change in the position in three-dimensional space of the display is monitored for, and the at least one positioning element is updated based on the monitoring.

20 Claims, 13 Drawing Sheets

(56) References Cited

U.S. PATENT DOCUMENTS

| | | | | |
|---|---|---|---|---|
| 2008/0049020 | A1 | 2/2008 | Gusler et al. | |
| 2008/0316372 | A1 | 12/2008 | Xu et al. | |
| 2009/0025022 | A1 | 1/2009 | Blatchley et al. | |
| 2009/0055853 | A1 | 2/2009 | Jung et al. | |
| 2009/0174658 | A1 | 7/2009 | Blatchley et al. | |
| 2010/0061586 | A1 | 3/2010 | Jain | |
| 2011/0148930 | A1 | 6/2011 | Lee et al. | |
| 2011/0206245 | A1 | 8/2011 | Eckhoff et al. | |
| 2011/0211738 | A1 | 9/2011 | Eckhoff et al. | |
| 2011/0211739 | A1 | 9/2011 | Eckhoff et al. | |
| 2011/0235807 | A1 | 9/2011 | Hayashi et al. | |
| 2011/0254846 | A1 | 10/2011 | Lee et al. | |
| 2012/0293405 | A1 | 11/2012 | Iida et al. | |
| 2013/0242068 | A1* | 9/2013 | Horiuchi | G02B 27/0093 348/55 |
| 2014/0071159 | A1 | 3/2014 | Ye et al. | |
| 2016/0005146 | A1 | 1/2016 | Thurling | |
| 2016/0091968 | A1 | 3/2016 | Angelo et al. | |
| 2016/0171289 | A1* | 6/2016 | Lee | G06F 3/011 382/118 |
| 2017/0310410 | A1 | 10/2017 | Jung et al. | |
| 2019/0004570 | A1 | 1/2019 | Lo et al. | |
| 2020/0110461 | A1* | 4/2020 | Trim | H04N 21/25891 |
| 2025/0203159 | A1* | 6/2025 | Kalam | H04N 21/44218 |

OTHER PUBLICATIONS

Apple, "Tracking and visualizing faces", available online at: <https://developer.apple.com/documentation/arkit/tracking-and-visualizing-faces>, 2025, 3 pages.

Bishay et al., "Monitoring Viewer Attention During Online Ads", Computer Vision and Pattern Recognition, arXiv:2504.06237 2025, 17 pages.

Dr. Raymond M. Soneira, "Changes in TV Picture Viewing Quality with Viewing Position", Display Mate, available online at: <https://www.displaymate.com/TV_Picture_Quality_with_Viewing_Position_1.htm>, 1990, 8 pages.

Google, "Pose Detection", available online at: <https://developers.google.com/ml-kit/vision/pose-detection>, 2024, 3 pages.

Microsoft, "What is face recognition?", available online at: <https://azure.microsoft.com/en-us/resources/cloud-computing-dictionary/what-is-face-recognition>, 2025, 3 pages.

Molly McHugh-Johnson, "How we made Pixel's Night Sight even faster", Google, available online at: <https://blog.google/products/pixel/night-sight-ai-faster/>, Apr. 18, 2023, 3 pages.

Satya Mallick, "Head Pose Estimation using OpenCV and Dlib", Learn OpenCV, available online at: <https://learnopencv.com/head-pose-estimation-using-opencv-and-dlib/>, Sep. 26, 2016, 10 pages.

* cited by examiner

SYSTEMS AND METHODS FOR IMPROVING CONTENT ITEM OUTPUT

The present disclosure is generally directed to systems and methods for enabling the improved output of content items at a computing device.

SUMMARY

It is a common occurrence for a group of users to watch video content on a computing device, such as a smartphone and/or a tablet. When a group of users view a video on a smartphone, the viewing experience may vary for each of the users due to the inherent viewing angle associated with a type of display at the smartphone. For example, a liquid crystal display (LCD) screen may have a viewing angle of 45 degrees, which means that users at the edge of the group may have a degraded viewing experience compared to users in the middle of the group, with respect to the smartphone display. This degraded viewing experience may manifest itself in reduced color accuracy, reduced contrast accuracy, reduced brightness accuracy of the video and/or a reduced perceived screen size. In some examples, the viewing experience may be degraded to the extent that it is difficult for a user to accurately perceive the displayed video. In other examples, if the smartphone is being held at a tilted angle with respect to one or more of the users in the group, the video itself may appear skewed. In some examples, one or more visual attributes of the video being displayed on the smartphone may impact the viewing experience. Similarly, an audio experience of audio associated with the video being played at the smartphone may also degrade based on the positioning of a user in the group. For example, if a smartphone comprises a left and a right speaker, a user sitting to the far right of the right speaker may experience audio coming from only the right speaker, which may give rise to a degraded experience. Therefore, there is a need to improve the output of content items at a computing device.

To help address these problems, systems and methods are provided herein that enable the improved output of content items at a computing device. In particular, the output of a content item being generated for display at a computing device is improved by providing one or more visual positioning elements to a group of users that enables the display to be repositioned in a manner that improves the viewing experience.

In accordance with some aspects of the disclosure, a first method is provided. In an embodiment, the method includes generating a content item for output via a display of a computing device, and determining that at least one user is engaging with the content item. A position of each user relative to the display is determined for each of the at least one users that is engaging with the content item, and a priority value for each of the at least one users is determined based at least in part on a characteristic associated with each of the at least one users engaging with the content item. Metadata associated with the display is accessed at the computing device, and a preferred output position for the display in three-dimensional (3D) space is determined based at least in part on the priority value for the each of the at least one users and the metadata. At least one positioning element configured to guide a change in a position of the display in 3D space is displayed at the display and based at least in part on the preferred output position, and monitoring for the change in the position in 3D space of the display is performed at the computing device. The at least one positioning element is updated based at least in part on the monitoring.

In an example system, a group of people watch a video on a smartphone. In this example, the smartphone utilizes an integrated camera and facial recognition to detect that each person in the group of people that is watching the video. Continuing the example, a position of each user's eyes, relative to the smartphone screen, is determined, and a priority value for each of the users is determined based on how long the user has been looking at the video. Metadata associated with the screen, for example, metadata indicating an viewing angle associated with the screen, is accessed. This viewing angle may be an optimal, desired, preferred, determined or selected viewing angle. In this example, the metadata is used to determine the viewing angle for each person in the group, and a preferred position of the screen, with respect to the people in the group, is determined to optimize, improve, or select the viewing angle for those who have been watching the video for the longest time. Continuing the example, visual indicators that prompt a movement of the smartphone screen into the preferred position are displayed on the screen, and the smartphone utilizes an integrated sensor, such as an inertial measurement unit and/or a camera (including a red green blue camera, a red green blue depth camera and/or a light detection and ranging (LiDAR) camera) to determine a position of the smartphone via simultaneous localization and mapping. In this example, the position of the smartphone is utilized to determine whether the screen has been moved to the preferred position. In this example, the visual indicators are then updated to indicate that further movement is required or that the smartphone screen is in the preferred position.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

A display includes any screen integral to, or attached to, a computing device. This may include, for example, a smartphone screen. A display includes, for example, a liquid crystal display (LCD), a light emitting diode (LED) display, an organic light emitting diode (OLED) display and/or an e-paper display. In some examples, the screen may be a virtual screen, generated in an extended reality environment.

A content item includes audio, video, text, a video game and/or any other media content. A content item may be a single media item. In other examples, it may be a series (or sea-son) of episodes a of content item. Video includes audiovisual content such as movies, short form video, social media reels and/or television programs or portions thereof. Audio includes audio-only content, such as podcasts or portions thereof. Text includes text-only content, such as event descriptions or portions thereof.

Determining a preferred output position for a display in 3D space includes determining a preferred output position in any degree of freedom associated with the display. This includes determining a translation of the display along an x, y and/or z axis; a yaw rotation; a pitch rotation and/or a roll rotation of the display.

The disclosed methods and systems may be implemented on one or more devices, such as user or client devices, servers, network management or other network devices, and/or other computing devices. As referred to herein, the device can be any device comprising a processor and memory, for example, a conference speakerphone, a handheld computer, a mobile telephone, a portable video player, a portable music player, a portable gaming machine, a smartphone, a smart television, a smartwatch, a smart speaker, an augmented reality headset, a mixed reality device, a virtual reality device, a gaming console, a smart board, an interactive whiteboard, a vehicle infotainment headend or any other computing equipment. Typically, a computing device will also comprise a network interface.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, DVD, CD, media card, register memory, processor cache, random access memory (RAM) and/or a solid-state drive.

Figure 1:
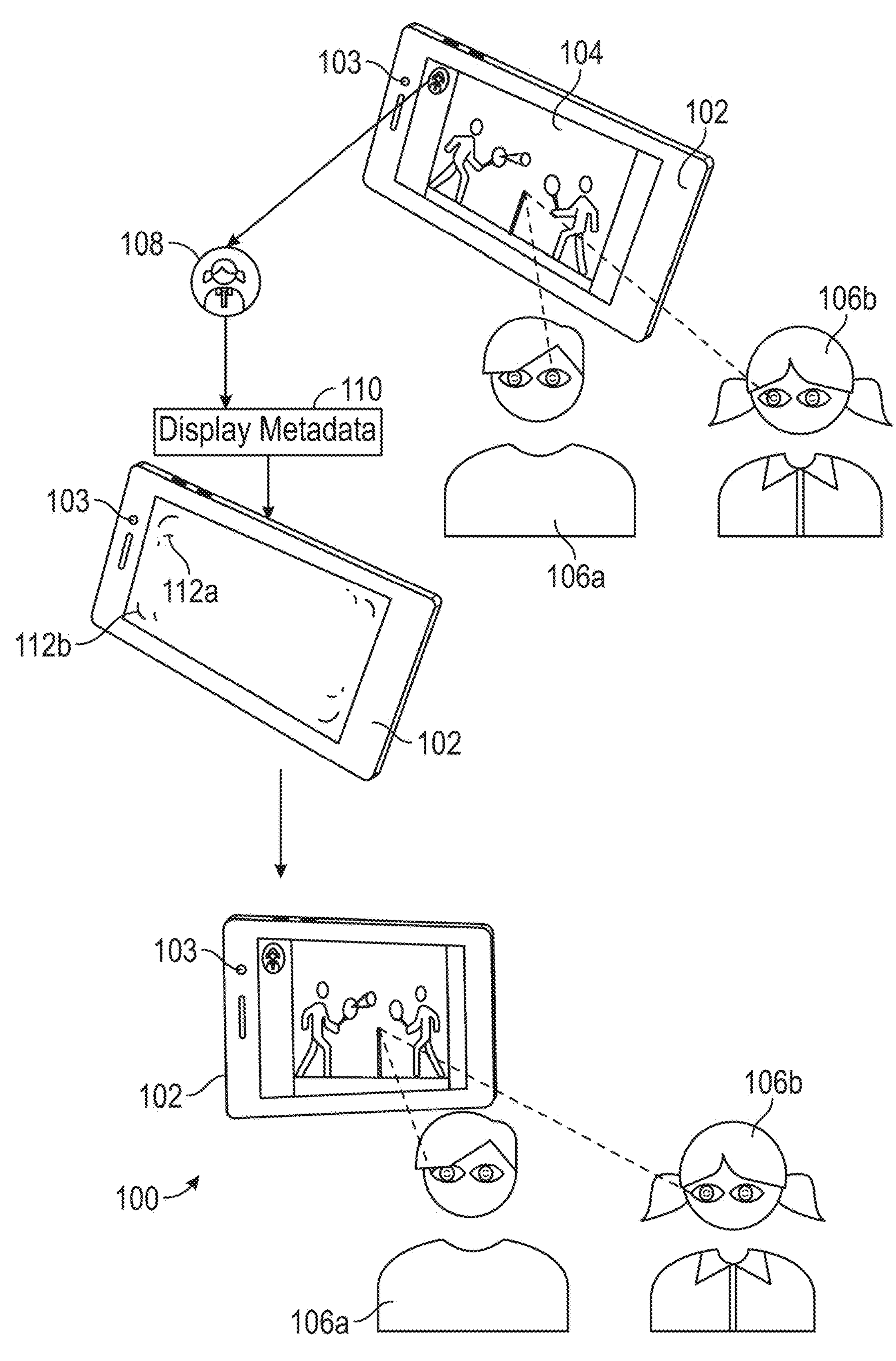
FIG. 1 shows an example environment for enabling improved content item output at a display, in accordance with some embodiments of the disclosure.

FIG. 1 shows an example environment for enabling the improved content item output, in accordance with some embodiments of the disclosure. The environment 100 comprises a computing device, in this example, a smartphone 102. The smartphone 102 receives content item 104, in this example a movie, from a content provider via a network such as the internet. In this example, two users, **106*a*, 106*b*, watch the content item 104 on the smartphone 102**.

The smartphone 102 determines that the users, **106*a*, 106*b*, are watching the content item 104. The smartphone 102 may comprise a capture device, in this example, a camera 103 that is utilized in the determination of whether the users 106*a*, 106*b* are watching the content item 104. The capture device may comprise a plurality of capture devices, including a plurality of cameras. In this example, the camera 103 captures images, periodically, of the users 106*a*, 106*b*. In some examples, the camera 103 may take captures of the users 106*a*, 106*b* throughout the playback of the content item. In some examples, the camera 103 may be triggered to capture photos of the users, e.g., if a user is detected to have moved, the camera may be triggered to take photos of the users. The capture device may comprise, for example, a webcam, a biometric sensor, e.g., an iris sensor, an infrared camera, an optical character recognition (OCR) sensor, and/or another suitable device. In this example, the camera 103 determines, from the captured images of users 106*a*, 106*b*, that the eyes of the users are directed towards the film 104 that is being displayed at the smartphone 102 and as such, determines the two users 106*a*, 106*b* are watching the content item 104. In some examples, an application running on the smartphone 102 may utilize facial recognition to determine an identity of each user 106*a*, 106*b* watching the content item. The camera 103 may use facial recognition to determine the user identity of users 106*a* and 106*b* and matches the user identity of user 106*b* with a user profile 108 associated with the content item 104. In other examples, the camera 103 may comprise a 3D depth camera, and using data captured via the 3D depth camera, an application running on the smartphone 102 may additionally, or alternatively, compute the distance of one or more of the users who are watching a screen of the smartphone 102**. In some examples, the user profile may be an account associated with an application that generates the content item.

In the example illustrated in FIG. 1, a priority value is assigned to each user, **106*a*, 106*b*, engaging with the content item 104. As user 106*b* has a user profile associated with the content item 104, user 106*b* is given the higher priority value. In some examples, the priority value may be based on the time duration a user has been watching the content item, or the attention span and/or movement of the user. In another example, user 106*a* may have been watching the content item for a longer period of time in comparison to user 106*b*** and as such, may be given a higher priority value than user 106*b*. In another example, the images captured by the camera 103 may determine the eye gaze of user 106*a* is away from the content item 104 and as such, user 106*a* may be given a lower priority value than user 106*b*. In another example, the camera 103 may have captured the user 106*a* moving away from the content item 104 for a period of time, and as such, may determine the priority value of user 106*a* to be lower than the priority value of user 106*b*. In some examples, the user with the fewest movements during the playback of the content item may be assigned the highest priority value, e.g., user 106*b* may constantly be leaving the room and as such, may be given the lowest priority value. In some examples, the priority value may be based on the determined amount of an attention of a user, as discussed in a later section. In another example, the priority value may be based on the computed distance of each user 106*a*, 106*b* from a screen of the smartphone 102, as determined, for example, via a 3D depth camera. A user who is, for example, determined to be closer the screen may be assigned a higher priority value, and a user who is, for example, determined to be farther away from the screen may be assigned a lower priority value. In some examples, the priority value may be a numerical value, e.g., the priority value may be between 0 and 1. In this example, user 106*a* may be given a priority value of 0.2 and user 106*b* may be given a priority value of 0.8.

The smartphone 102 accesses the display metadata 110. The display metadata may be, but is not limited to, a viewing angle of the display screen, a display bias of the display screen and/or a color depth of the display screen. The preferred output position may be determined based on the display metadata 110. In some examples, a preferred output position of the display may be determined based on the display metadata. For example, with LCD and LED displays, the degradation in colors and contrast when viewed at off-center angles may be compensated by moving the display to a position that minimizes the worst off-center angle, minimizes the average off angle, and/or minimizes the variation among users. The preferred output position of the display may be derived based on display characterization at various viewing angles. For example, the smartphone 102 may have an LED display, and as such, a user may experience a degradation in the perceived quality of the displayed content from an angle of 70 degrees or less, relative to the display screen. As such, an optimal, preferred, or determined viewing angle, where the user experiences no degradation in the perceived quality of the displayed content, may be between 70 degrees and 110 degrees, relative to the display. In this case, the preferred position of the display at smartphone 102 may be based on the display metadata such that the preferred output position may be at an angle of 90 degrees, e.g., perpendicular to the display screen. In some examples, the user being perpendicular to the display screen may not be at an optimal, preferred, determined or desirable viewing angle to perceive the highest image quality. For example, derived from the display metadata, the display screen may have a bias angle. A bias angle may be an angle determined based on estimated perceivable image quality. In some instances, the bias angle is considered an optimal angle to perceive image quality. For example, public displays such as departure boards in train stations or airports often have a downward bias, and as such, the preferred position of the display screen may be based on the display bias. The display metadata may be used alone or in combination with the priority value for the determining of the preferred output position. In the example illustrated in FIG. 1, the user 106*b* has been identified as having a user profile 108 associated with the content item 104 being displayed, and as such, a higher-priority value has been assigned to user 106*b* in comparison to user 106*a*. The identity of the user may be determined using facial recognition, via images taken from the camera 103. In some examples, the system, e.g., the smartphone 102, may identify a set of facial feature points from the images taken by camera 103 and compare the images to a database of facial feature sets. The database may be provided externally, e.g., by a third-party application, or may be limited to the contacts of a user, e.g., photo albums stored on the smartphone 102 may be used to identify contacts in images taken by the camera 103. Additionally, or alternatively, a user identity may be identified by communicating with devices connected to the same network or using wireless networks, e.g., Bluetooth. In some examples, the system, e.g., smartphone 102, may determine the head pose of the user in real time based on device sensor data, e.g., a front-facing camera. Head pose refers to the overall orientation and position of the head in 3D space. Head gaze is derived from the head pose, in which the head gaze describes the direction of the eyes of the user. In this case, the head gaze of the user may also be used to determine a priority value for the user. In this example, the preferred output position of the display at smartphone 102 is derived from the priority value of each user watching the content item 104 and the display metadata 110. In this example, considering the priority value of user 106*b*, the viewing angle of the preferred position for user 106*b* is 80 degrees, between 70 degrees and 110 degrees. Considering the priority value of user 106*a*, the viewing angle of the preferred output position is 60 degrees.

To guide the users 106*a* and 106*b* to the preferred output position 112*a*, positioning guidance elements are displayed at the display of the smartphone 102. In this example, the positioning elements are two-dimensional (2D), and display an optimal, preferred, or determined output position 112*a* and the axis of the current position 112*b* of the smartphone 102. To guide the user to the preferred output position, the user may move the smartphone 102 to align the current position 112*b* of the smartphone 102 to the preferred output position 112*a*.

Figure 2:
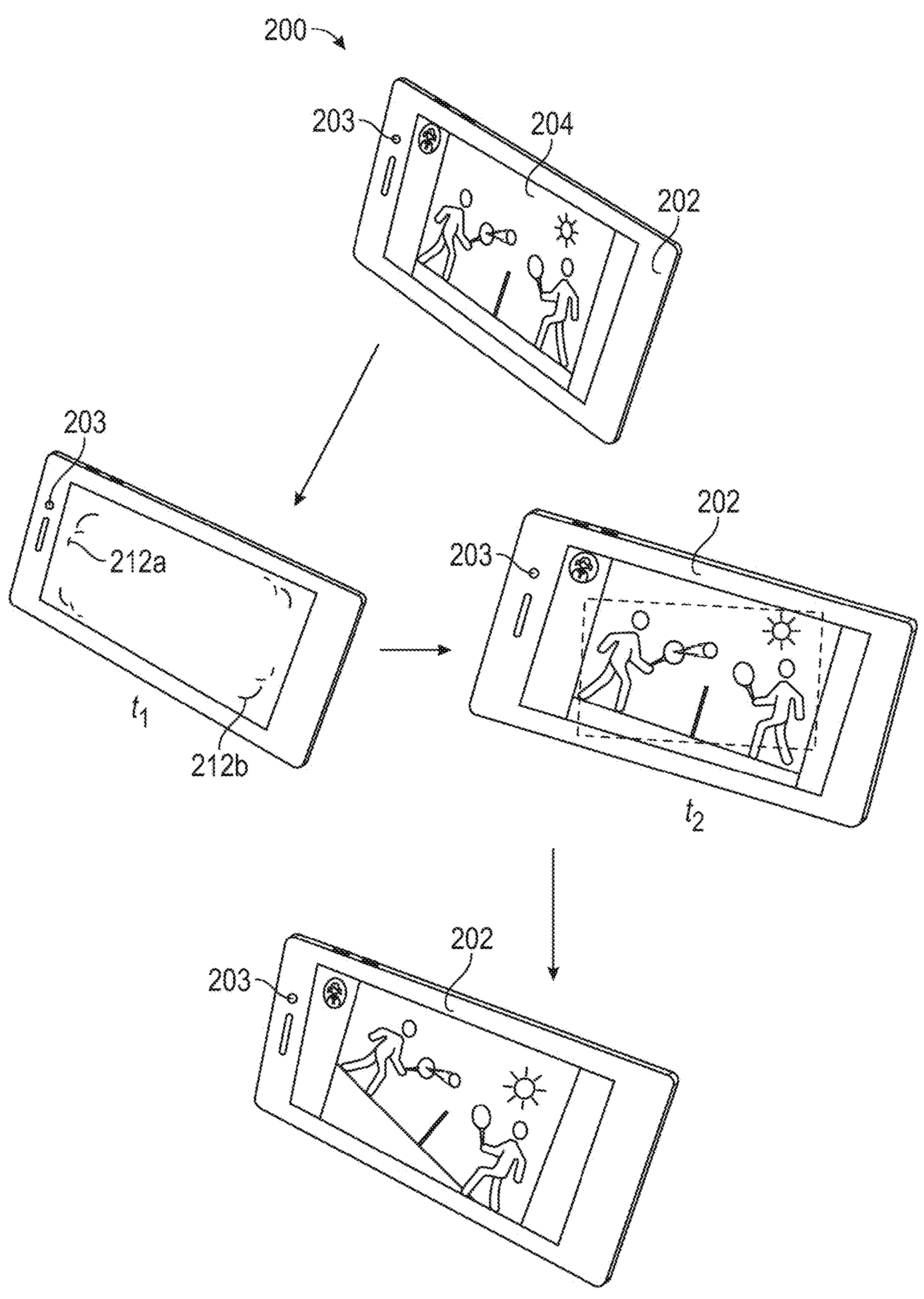
FIG. 2 shows an example environment for enabling improved content item output at a display using rendering, in accordance with some embodiments of the disclosure.

FIG. 2 also shows an example environment for enabling improved content item output, in accordance with some embodiments of the disclosure. The environment 200 comprises a smartphone 202. The smartphone 202 receives content item 204, a movie, from a content provider via a network, such as the internet. In this example, users watch the content item 204 and are notified to change the current position 212*b* of the smartphone 202 to a preferred output position 212*a*, at time $t_1$. After a threshold period of time has passed in which a threshold change in position of the smartphone has not been reached or exceeded, the rendering of the content item 204 may occur. For example, a threshold period of time, e.g., three minutes, in which the position of the smartphone has not moved to the preferred output position may trigger the rendering of the content item. In some examples, there may be an upper threshold associated with the change in position of the smartphone 202. For example, the user may move the smartphone 202 to a position that is farther away from the preferred output position in comparison to the position of the smartphone at $t_1$. In this case, if the upper threshold of the change of position of the smartphone 202 is exceeded, rendering may be triggered. At time $t_2$, rendering of the content item 204 commences to adjust the content item 204 to an optimal, preferred or determined viewing angle for all, or a subset of, users watching the content item 204. In some examples, rendering may be executed by the software of the smartphone 202, a first-party application and/or a third-party application installed on smartphone 202. In the example shown in FIG. 2, the content item 204 is rotated on the x and y axis by a content application. In some examples, content item 204 may be rotated about the x and/or y axis during a rendering phase by the content application. For example, the perspective of the content item 204 may be changed by applying an angle of rotation on the y axis, e.g., a 20-degree angle of rotation. In this case, the content item may appear to be 3D. In some examples, the content item 204 may be tilted on the x axis at an angle, e.g., a 20-degree angle. The content item may be tilted a few degrees to achieve the optimal, preferred or determined viewing angle for all, or a subset of, detected users. Applying an angle of rotation to an axis may be used in isolation or in combination with a scaling effect to fill the screen, e.g., the content item 204 may be zoomed in to fill the areas that may have been removed by the rotation of the content item 204. The scaling effect may be executed via a browser extension. In some examples, a streaming platform comprising a video player may have a transform added to a video player. For example, content item 204 may be streamed from a webpage. In this case, Cascading Style Sheets (CSS) transforms may be applied, e.g., transform rotate (Zdegrees) to rotate specific video elements, using hypertext markup language 5 (HTML5) methods. The example below is an HTML5 method being used in combination with scaling and translation for positioning:

```
.widget-webframe-frame{
  transform:scale(0.8) rotate(20deg) translate(-100px, -78px);
  height: 600px;
  width: 800px;
}
```

Rendering being executed during the streaming of content item 204 may be completed considering the dynamic nature of a stream, e.g., objects appearing in video frames may drastically change and/or the position of the users watching the streaming content item 204 may change. Taking this into consideration, in some examples, the transforms and rotation angles may be kept within guardrails, e.g., an upper and lower bound, floors and ceilings, and may be applied not in a burst fashion but granularly within a sliding time window in order to avoid a constantly rotating video, which may diminish a quality of experience for a user.

In some examples, for server-side content tilting, one or video streaming servers may tilt and/or rotate a video stream during the encoding of the video stream. The server-side content tilting may be performed in response to a request for a specific operation to be applied to the video stream; in other examples, one or more users' positions and/or optimal, preferred or determined viewing angles may be transmitted to a streaming server, and the operation may be determined at the streaming server. In an example, a video streaming server may encode the video with a change in the aspect ratio and/or orientation before the video stream is streamed to a computing device such as, for example, smartphone 202. Continuing the example, an optimal, determined or preferred aspect ratio and/or origination for the users watching the display may be communicated to a live encoder via signaling. For example, the signaling may be used to control the pant-tilt-zoom (PTZ) parameters of a camera and/or apply a delta to the video output, during live streaming sessions.

A change in a position of one or more of the users may be detected via, for example, camera 203, and the smartphone 202 may transmit an updated user position to a streaming server and/or request an updated video stream with a different aspect ratio and/or orientation that corresponds with the detected new position of the user. To avoid constant changes in rendering of the content item 204 in response to small changes in user position, a threshold in the change of position of a user watching the content item 204 may be implemented. For example, when the position of the user has changed such that the change is below the threshold value, no change in rendering may take place. In another example, when the position of a user watching the content item 204 has changed such that the change is above the threshold value, the smartphone 202 may transmit an updated user position to the streaming server and/or request an updated video stream with a different aspect ratio and/or orientation that corresponds with the detected new position of the user.

In other examples, the streaming server may generate different encoded versions of the content item 204 based on different optimal, preferred or determined viewing angles, or ranges of viewing angles and/or indicated user positions. For example, the streaming server may store encoded versions of the content item 204, where the version comprises a rendered version of the content item 204 associated with a viewing angle, or a range of viewing angles. In some examples, different segments of the content item 204 may be associated with different optimal, determined or preferred viewing angles. The different encoded versions of the segments of the content item 204 may be calculated utilizing metadata comprising a preferred viewing angle, e.g., the original format of the video, and a tilted video angle, e.g., a rotation angle of 30 degrees about an x axis, wherein the differentiating metadata comprises x and y axis degree parameters.

Figure 3:
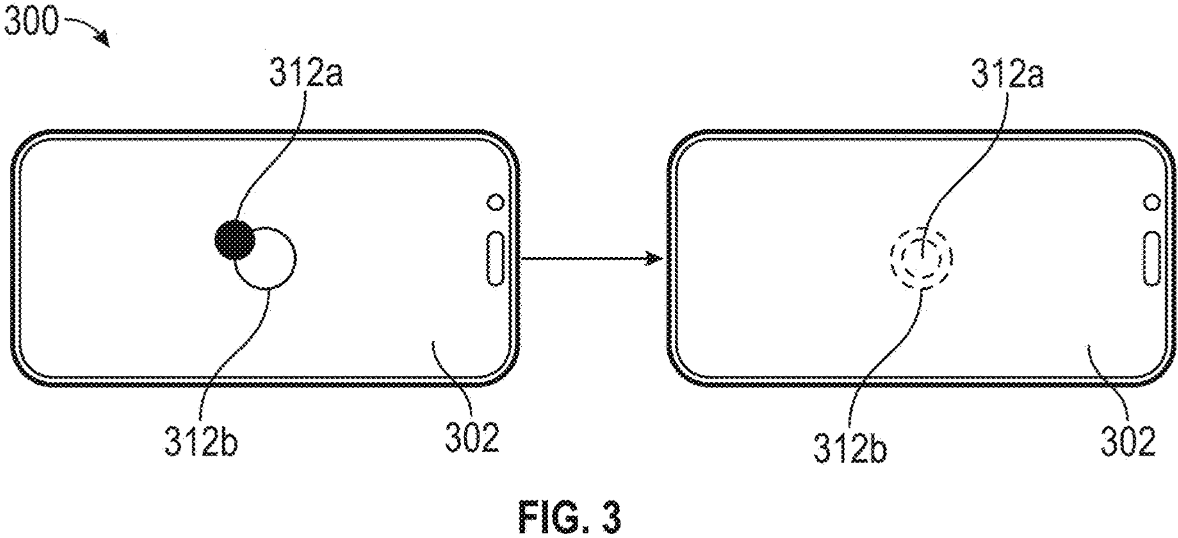
FIG. 3 shows an example environment for enabling improved content item output at a display using positioning elements, in accordance with some embodiments of the disclosure.

FIG. 3 shows an example environment for enabling the improved content item output via positioning elements, in accordance with some embodiments of the disclosure. In this example, the environment 300 comprises positioning elements visually displayed at the smartphone 302. The positioning elements 312*a*, 312*b* comprise a current position 312*a* of the smartphone 302 and a preferred output position 312*b*, in this example, at the center of the smartphone 302. In this manner, the user may be guided via the positioning elements to move the smartphone 302 to the preferred output position 312*b*. In some examples, the application and/or the software of the smartphone 302 may modify the color of the positioning elements based on the color of the pixels in the region that would be occupied by the positioning elements. For example, the user may be watching a segment of a content item that includes green trees, and as such, the positioning elements may be modified to also be shades of green to avoid the obstructing the view of a user. In some examples, the positioning elements may comprise visual, audio, vibrating, haptic and/or notifications to guide the user to the preferred output position. For example, the smartphone 302 may vibrate when the user moves the smartphone 302 farther away from the preferred output position. In some examples, the positioning elements may increase based on the deviation from the preferred output position. For example, no haptic feedback may occur when the smartphone 302 is in the preferred output position, but the haptic feedback may commence when the smartphone 302 moves away from the preferred output position. In some examples, the content item may be paused when the positioning elements are displayed at the smartphone 302. In this case, the content item may be resumed when the user moves the smartphone to the preferred output position. In some examples, the content application executing the content item may allow users to access settings to format the positioning elements, e.g., the setting may comprise a graphical interface that allows users to select the size of the positioning elements and/or the type of positioning elements, e.g., audio positioning elements may be selected.

Figure 4:
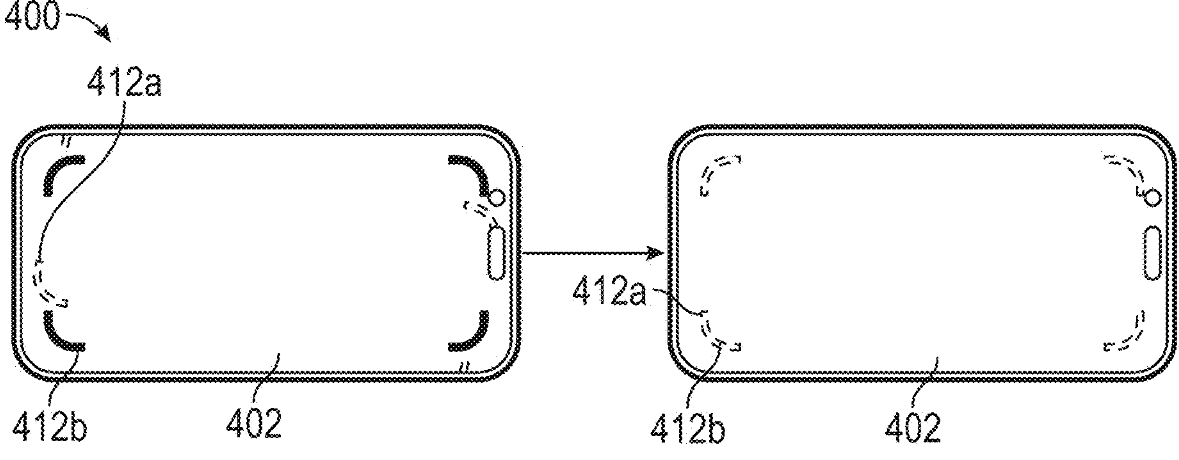
FIG. 4 shows another example environment for enabling improved content item output at a display using positioning elements, in accordance with some embodiments of the disclosure.

FIG. 4 also shows an example environment for enabling the improved content item output via positioning elements, in accordance with some embodiments of the disclosure. In this example, the environment 400 comprises positioning elements visually displayed in 2D space at a smartphone 402. In this example, positioning elements 412*a*, 412*b* comprise a current position 412*a* on a 2D plane and the preferred output position 412*b* of the smartphone on the 2D plane. The positioning elements may guide a user to move the smartphone 402 in 2D space, to the preferred output position 412*b*, e.g., a user may move the phone to the right, left, upwards and/or downwards to move the smartphone 102 to the preferred output position 412*b*. When the user has successfully moved the smartphone 102 to the preferred output position 412*b*, the positioning elements 412*a* and 412*b* align.

Figure 5:
FIG. 5 shows another example environment for enabling improved content item output at a display using positioning elements, in accordance with some embodiments of the disclosure.
Figure 5:
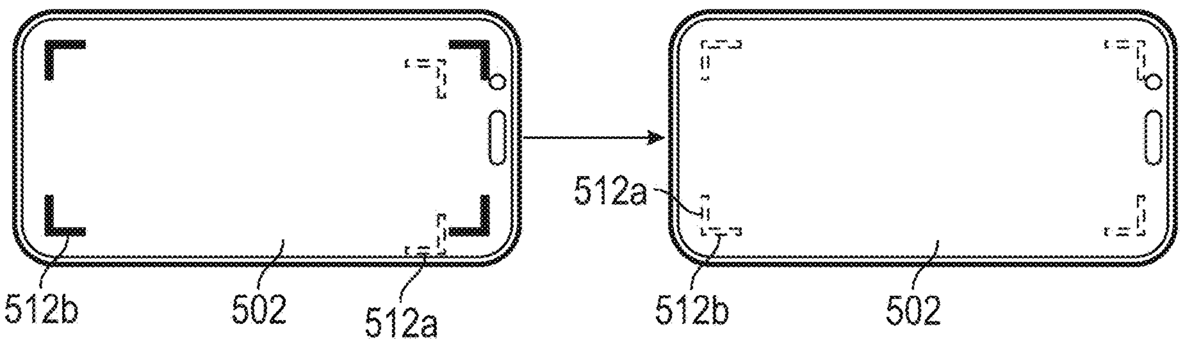

FIG. 5 also shows an example environment for enabling the improved content item output via positioning elements, in accordance with some embodiments of the disclosure. In this example, the environment 500 comprises positioning elements 512*a*, 512*b* visually displayed in 3D space at a smartphone 502. In this example, the positioning elements 512*a*, 512*b* comprise a current position 512*a* of the smartphone 502 in 3D space and a preferred output position 512*b* of the smartphone 502 in 3D space. The positioning elements 512*a*, 512*b* may guide the user to move the smartphone 502 in 3D space to the preferred output position 512*b*, e.g., a user may rotate the smartphone 102 about the x axis and/or the y axis to move the smartphone 502 to the preferred output position. When the user has successfully moved the smartphone 502 to the preferred output position 512*b*, the positioning elements 512*a* and 512*b* align. In some examples, for a user wearing an extended reality (XR) headset, a visual representation of the smartphone 502 in the preferred output position may be displayed at the XR headset. An XR headset may include, for example, an augmented reality, a virtual reality and/or a mixed reality headset. For example, the XR headset may display an overlay of a rotated smartphone 502 in the preferred output position 512*b*, wherein the overlay is positioned at the current position of the smartphone 502 to guide the user to move the smartphone 502 to the preferred output position 512*b*. In some examples, positioning elements 512*b* and 512*a* may be displayed at the XR headset with a transparent overlay, e.g., a user wearing the XR headset may perceive the positioning elements incorporated in a real-life environment and be guided to the smartphone 502 to the preferred output position 512*b*.

Figure 6:
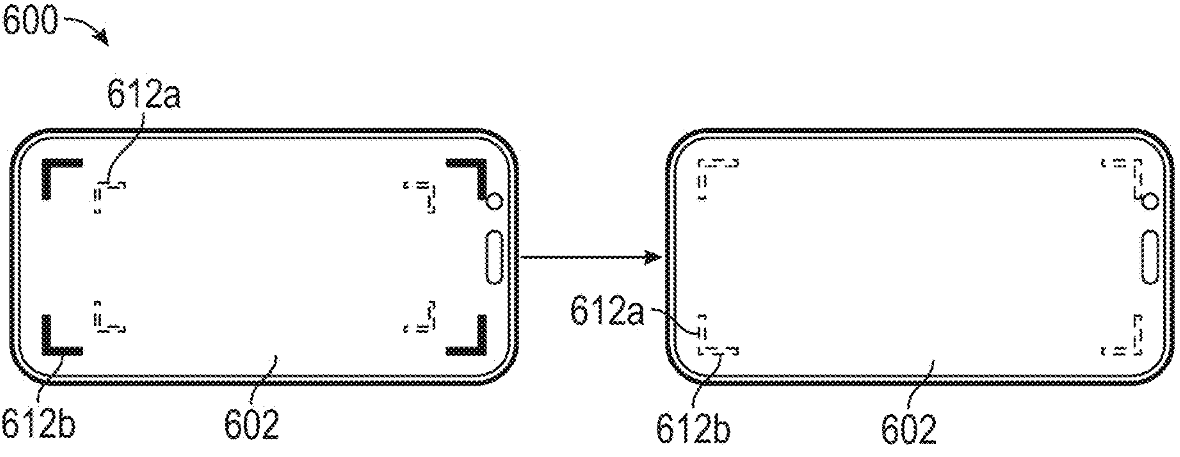
FIG. 6 shows another example environment for enabling improved content item output at a display using positioning elements, in accordance with some embodiments of the disclosure.

FIG. 6 also shows an example environment for enabling the improved content item output via positioning elements, in accordance with some embodiments of the disclosure. In this example, the environment 600 comprises positioning elements 612*a*, 612*b* visually displayed in 3D space at a smartphone 602. In this example, the positioning elements 612, 612*b* comprise a current position 612*a* of the smartphone 602 and a preferred output position 612*b* of the smartphone 602. The positioning elements guide the user to move the phone in 3D space, e.g., the smartphone 602 may be moved closer to the user or farther away from the user. When the user has successfully moved the smartphone to the preferred output position 612*b*, the positioning elements 612*a* and 612*b* align. In some example, a user may be wearing a XR headset and viewing the smartphone 602. In this case, the XR headset may display a transparent overlay of the positioning elements mapped onto the smartphone 602 in a real-life environment. In some examples, the XR headset may detect, using a capture device and/or sensor, that an object is obstructing the path of the preferred output position 612*b*, such that the user may not be able to move the smartphone 602 to the preferred output position 612*b*. In this case, the XR headset may receive a notification instructing the user to remove the object from the path of the preferred output position 612*b*.

Figure 7:
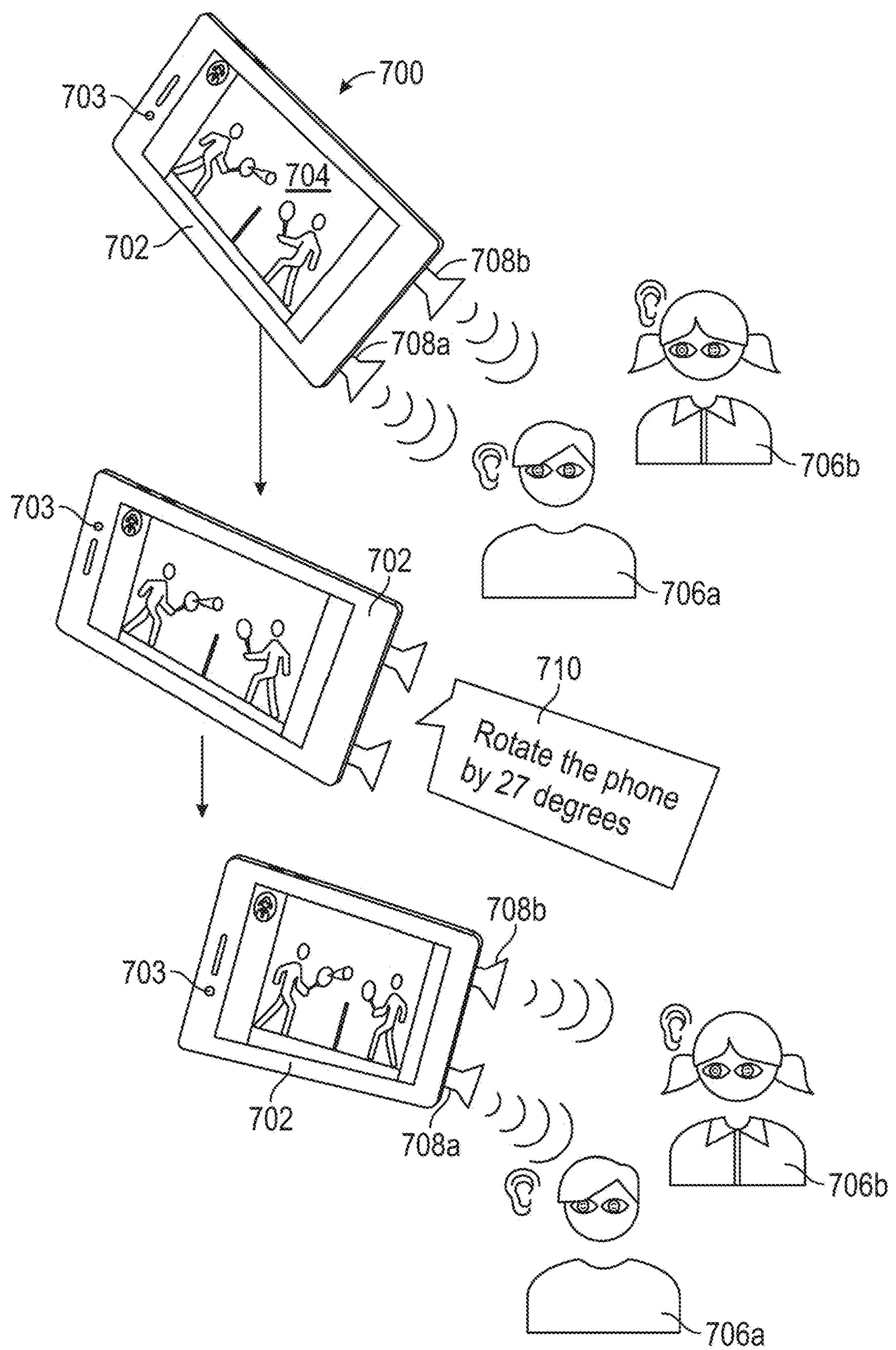
FIG. 7 shows an example environment for enabling improved content item output at a speaker, in accordance with some embodiments of the disclosure.

FIG. 7 shows an example environment for enabling the improved content item output at a speaker, in accordance with some embodiments of the disclosure. In this example, the environment 700 comprises a smartphone 702 comprising a display and two speakers 708*a*, 708*b*. A content item 704 is output at the smartphone 702, which comprises outputting a video component via a screen of the smartphone 704 and an audio component via the two speakers 708*a*, 708*b* of the smartphone 704. A camera 703, integral to the smartphone 704 in this example, is utilized by the smartphone to detect two users 706*a*, 706*b*, who are engaging with the content item 704. In some examples, motion tracking may be used to detect whether a user 706*a*, 706*b* is listening to the audio of the content item 704, e.g., the content item 704 may comprise a song, and motion tracking may be used to detect that one or more of the users 706*a*, 706*b* are dancing and/or rhythmically moving to the song. In this example, metadata associated with the speakers 708*a*, 708*b*, and a determined priority value for each of the users 706, 706*b* are used to determine a preferred output position of the smartphone 704. For example, the metadata of the speakers 708*a*, 708*b* may comprise a type of speakers, e.g., directional or omnidirectional speakers; an audio distance of the speakers 708*a*, 708*b*, e.g., how far the audio travels across a room; and/or a volume of the speakers 708*a*, 708*b*, e.g., 80 dB. In this example, the two speakers 708*a*, 708*b* are directional speakers, and as such, the preferred listening position may be near the center of the two speakers 708*a*, 708*b*. The preferred position of the speakers 708*a* and 708*b* may be weighted by the priority value of each user 706*a*, 706*b*. In this example, a first user 706*a* may have a higher priority value due to, for example, having a user profile associated with the content item 704, and as such, the preferred output position of the speakers may prioritize the audio being received by first user 706*a*. In some examples, the camera 703 may determine a second user 706*b* is uninterested in the content item 704, e.g., the eye gaze of second user 706*b* has moved away from the screen. In this case, the priority value of the second user 706*b* may be lower in comparison to the first user 706*a*. In some examples, the camera 703 may detect the second user 706*b* has moved away from the speakers 708*a*, 708*b*. In this case, the priority value may decrease for the second user 706*b*. In some examples, the preferred output position may be determined for each speaker 708*a*, 708*b*. For example, the preferred output position may be determined for two different types of speakers. In some examples, the preferred output position may be determined for a plurality of speakers.

In the example illustrated in FIG. 7, a preferred output position is determined, and an audio positioning instruction 710 is outputted by the speakers 708*a* and 708*b*. In this example, the audio positioning instruction 710 instructs the user to rotate the phone by 27 degrees. In other examples, the audio positioning instruction 710 may be accompanied with visual positioning elements at the smartphone 702. For example, audio may be used to alert the user that the smartphone 702 is moving farther away from the preferred output position. In this case, the audio, e.g., an alarm, may increase in sound volume as the user moves farther away from the preferred output position. In some examples, the audio positioning instruction 710 may comprise a list of instructions to guide the user to the preferred output position, e.g., the audio positioning instruction 710 may tell the user to move the phone farther away from the user and to tilt the phone downwards. In some examples, the preferred output position may be determined based on the volume of the speakers 708*a* and 708*b*, e.g., the preferred output position may be farther away from the user to avoid exceeding the limit of human hearing. In some examples, the smartphone 702 may identify an overlap in the display's field of view and the direction of speaker angle range, and as such, output at the speakers an audio positioning instruction 710 to guide the smartphone 702 to be moved to the preferred output position. As seen in FIG. 7, the user receives the audio positioning instruction 710 and moves the smartphone 702 to the preferred output position. For example, the audio positioning instructions 706 may be natural language instructions provided in any suitable language (e.g., based on a user's preference for English, Spanish, or any other language).

Figure 8:
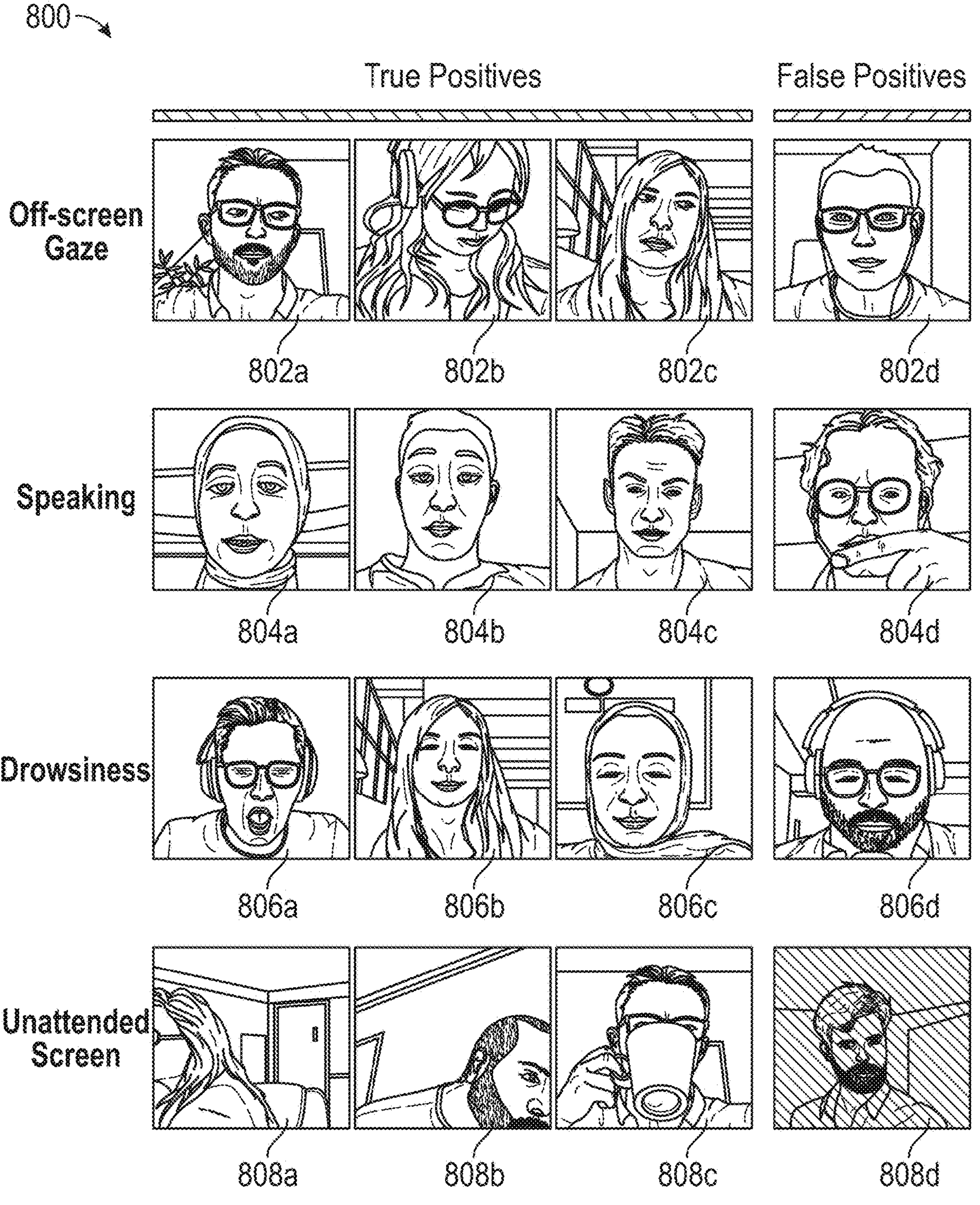
FIG. 8 shows an example table for use in determining user engagement with a content item, in accordance with some embodiments of the disclosure.

FIG. 8 shows an example table for use in determining user engagement with a content item, in accordance with some embodiments of the disclosure. In this example, the table 800 comprises a plurality of images taken by a capture device, e.g., a camera integral to a smartphone as discussed herein, used to determine an attention level of a user and as such, be utilized to determine whether a user is engaged with the content item. In this example, a smartphone and/or a third-party application may determine the attention level of a user by analyzing features such as, but not limited to, the head gaze, eye gaze, drowsiness and speaking. In this example, a machine learning model may be trained on images with a plurality of different facial expressions, taken from a database, to identify an off-screen gaze during the playback of a content item. In this example, users 802*a*-802*c* are correctly identified as gazing off-screen, while user 802*d* is a false positive result due to the glare from the glasses attached to the user. When an off-screen gaze is identified, a score associated with the level of engagement of the user may be determined. The level of engagement of a user may be a numerical value, e.g., a range between 0 and 1 wherein 1 is a highly engaged user and 0 is a user who is not engaged in the content item. For example, a user identified as having an off-screen gaze during content item output may be given a 0.2. In this case, the level of engagement of the user may be compared to a threshold level of user engagement, e.g., the threshold level of user engagement may be 0.5, and as such, the user may be determined not be engaging with the content item. In some examples, the system, e.g., smartphone or a third-party application, may provide settings, e.g., via a graphical interface, that allows the user to set the threshold level of user engagement. In some examples, a time threshold may be used to determine the level of engagement of the user and reduce the false positive results. For example, a user gazing off-screen for 5 seconds may be identified as engaging in the content item, despite the user gazing off-screen. In this case, the glare on the glasses of user 802*d* may disappear within this time period, and as such, user 802*d* may be correctly identified as engaging with the content item. In another example, a user gazing at the display for less than 3 seconds as they walk past the display may be identified as not engaging in the content item. In some examples, a priority value may be determined, based on the level of engagement of the user. In some examples, the score associated with the level of engagement of the user may be utilized to weight to the priority value, for example, a level of user engagement of 0.2 may decrease the priority value. In some examples, the time threshold may be used when determining the priority value for each user engaged in consuming the content item. The system may "ignore" (with regard to assigning priority) people or users who are merely passing by or not engaging with the display (e.g., someone walking by the display). For example, a smartphone may detect and ignore a user viewing a display, for 5 seconds, as they walk past the display. In this case, the duration in which the user may be viewing the content item may be compared to the time threshold, and as such, may be determined to not be engaging in the content item. In this case, the user may not be assigned a priority value.

In the example illustrated in FIG. 8, a machine learning model may be trained on a plurality of facial features, taken from a database, to correctly identify users 804*a*-804*c* speaking during the playback of a content item. User 804*d* is a false positive result due to a hand covering the mouth of the user. When a user speaking is identified, a score associated with the level of engagement of the user is determined, for example, it may be reduced.

In the example illustrated in FIG. 8, a machine learning model may be trained on a plurality of facial features, taken from a database, to correctly identify users 806*a*-806*c* displaying drowsiness during the playback of a content item. User 806*d* is a false positive result due to a downward gaze of the user. When the drowsiness of a user is identified, a score associated with the level of engagement of the user is determined, for example, it may be reduced. In some examples, audio of the user may be accessed, alone or in combination with the identification of facial features, to determine the level of engagement of the user. For example, a microphone may be used to detect a user yawning and as such, may determine the level of engagement of the user. In another example, a microphone may detect a user is speaking to another person and as such, may determine the level of engagement of the user.

In the example illustrated in FIG. 8, a machine learning model may be trained on a plurality of facial features, taken from a database, to correctly identify users 808*a*-808*c* not attending to a screen during the playback of a content item. User 808*d* is a false positive result due to the dark conditions the user is in. When an unattended screen is identified, a score associated with the level of engagement of the user may be determined. In some examples, capture devices, such as a camera, may be used in combination with biometric sensors, e.g., infrared sensors, to reduce a false positive result. For example, for a user in very dark conditions, an infrared sensor may be used to determine the head pose of the user. When the head pose is determined to be directed towards the display, the level of engagement of the user may be determined.

Figure 9:
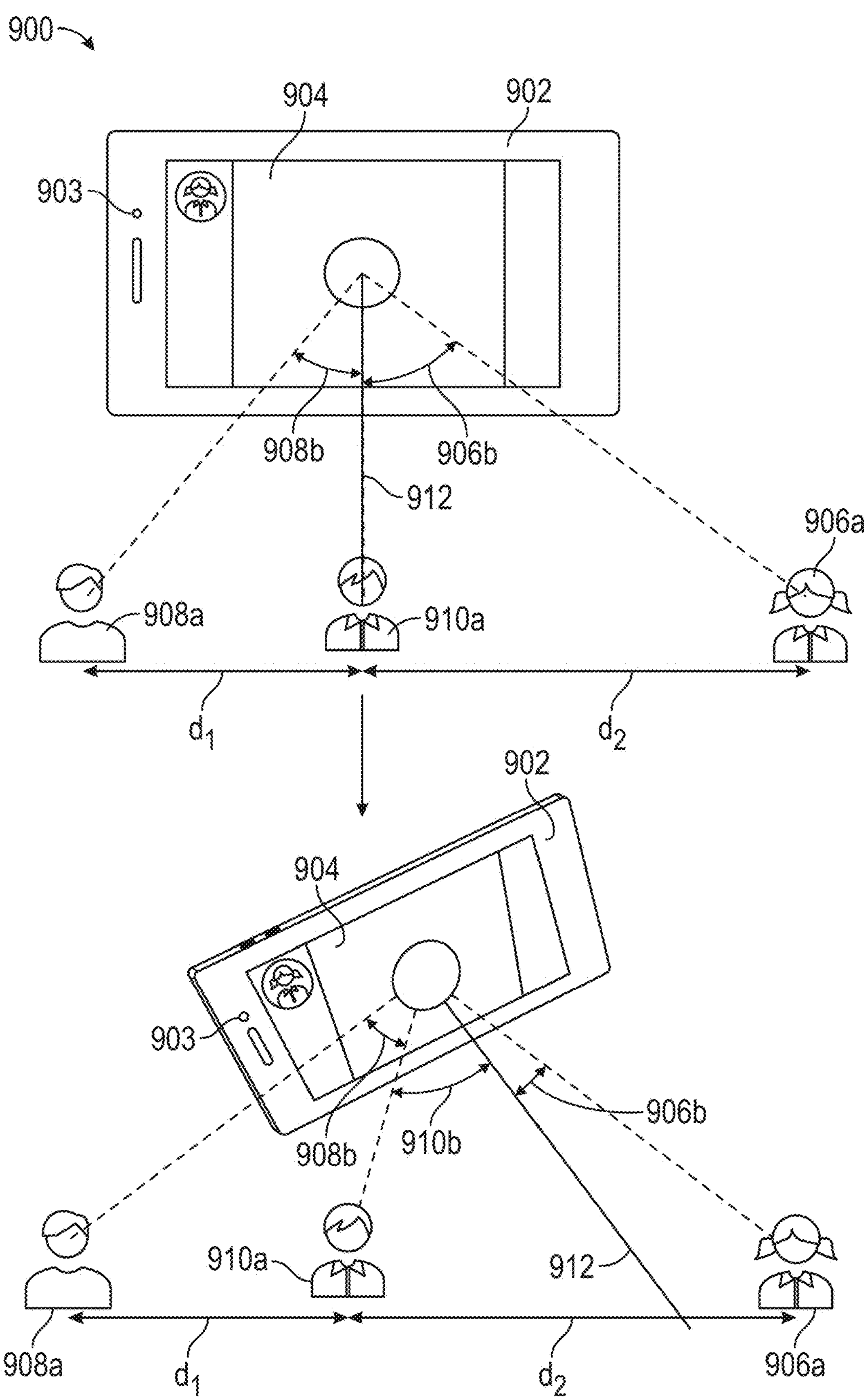
FIG. 9 shows another example environment for enabling improved content item output, in accordance with some embodiments of the disclosure.

FIG. 9 shows another example environment for enabling the improved content item output, in accordance with some embodiments of the disclosure. In this example, the environment 900 comprises a tablet 902 displaying content item 904 and three users 906*a*, 908*a*, 910*a* watching the content item 904. In this example, a position of the display of tablet 902 is calculated to give a viewing angle that is closest to the optimal, preferred or determined viewing angle to the display for each of the users 906*a*, 908*a* and 910*a*. An optimal, preferred or determined viewing angle is an angle, or range of angles, at which an output of a display is optimal, preferred or determined when viewed from this angle, or range of angles. This may include, for example, a range of angles at which colors are perceived with more contrast, colors are perceived as truer, brightness is perceived as less decreased and/or images are perceived as less distorted than when compared to other angles outside of the range. In this example, the optimal, preferred or determined viewing angle 912 is perpendicular to the display of the tablet 902. The viewing angle 906*b*, with respect to the center of the display, is 70 degrees, where the user 906*a* experiences a degradation in the perceived contrast and size of the display. The viewing angle 908*b* of the user 908*a*, with respect with the center of the display, is 45 degrees, wherein the user 908*a* experiences minor degradation to the perceived contrast and size of the display. In this example, the tablet 902 determines that the display cannot be positioned to achieve the optimal, preferred or determined viewing angle due to the positioning of the users 906*a*, 908*a* and 910*a*.

Figure 10:
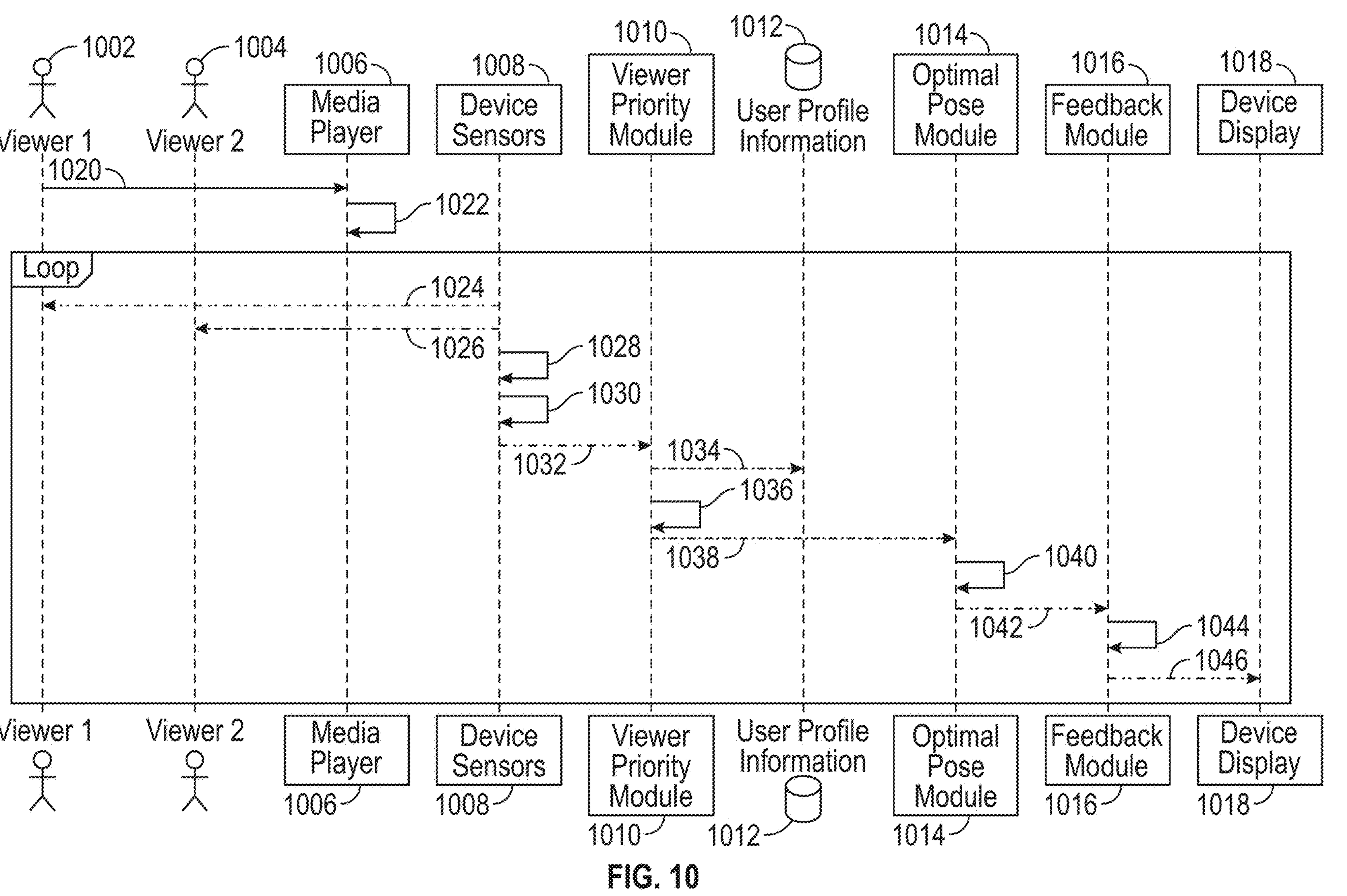
FIG. 10 is an example sequence diagram for enabling improved content item output, in accordance with some embodiments of the disclosure.

FIG. 10 shows an example sequence diagram for enabling improved content item output, in accordance with some embodiments of the disclosure. The flow diagram 1000 comprises a first user 1002, a second user 1004, a media player 1006, device sensors 1008, a viewer priority module 1010, a user profile information database 1012, an optimal pose module 1014, a feedback module 1016 and a device display 1018.

At 1020, the first and/or second viewer 1002, 1004 initiates media playback at the media player 1006. At 1022, display metadata is retrieved by the media player. The following steps 1024-1046 loop. At 1024 and 1026, the device sensors 1008 are utilized to detect the respective first and second viewers 1002, 1004. At 1028, the device sensors 1008 are utilized to detect the users' 1002, 1004 head poses. At 1030, the device sensors 1008 are utilized to determine additional viewer features. At 1032, the viewer features are transmitted to the viewer priority module 1010. At the viewer priority module 1010, at step 1034, user profile metadata is retrieved from the user profile information database 1012. At 1036, the viewer priority is determined at the viewer priority module. At 1038, the viewer priority values are transmitted to the optimal pose module 1014, where, at step 1040, an optimal, preferred or determined pose, or position, of the computing device outputting the content item is determined. At 1042, the determined optimal, preferred or determined pose is transmitted to the feedback module 1016, where visual feedback is generated (for example, one or more position indicators that guide user movement of the computing device to the optimal, preferred or determined position). The generated visual feedback is transmitted 1046 from the feedback module 1016 to the device display 1018.

In some examples, an application running on a computing device may consider the size of positioning elements displayed on the display, such as text, when determining an optimal, preferred or determined position of the computing device.

In some examples, a viewer identity may be associated with content preferences (e.g., cat videos and/or Taylor Swift) via, for example, a user profile. If viewer preferences are known, an application running on a computing device may identify content elements in selected media and estimate a match score for each viewer having known viewer preferences. Based on relative match scores, the system may adjust a viewer's priority value to favor viewers whose interests better match the selected content.

In some examples, feedback, such as visual positioning indicators, may be delivered by devices other than the one displaying a content item. For example, a user wearing an augmented reality headset may see visual feedback overlaid on the display. Similarly, a user wearing a smartwatch may receive haptic feedback on the watch, rather than the device displaying the content item. The haptic feedback may comprise directional haptic feedback, such as a portion of the smartwatch vibrating, which may indicate that the device, such as a smartphone, displaying the content item should be moved in a certain direction. In an example, a top right hand corner of the smartwatch may vibrate, indicating that the device displaying the content item should be tilted up towards to the top right hand corner of the device. In another example, a wave of vibrations may be generated at the smartwatch, indicating how the device displaying the content item should be moved. For example, a clockwise circular wave of vibrations may generated, indicating that the device displaying the content item should be rotated clockwise. Offloading feedback rendering and presentation to other devices helps enable an optimal viewing experience by removing distracting overlays or vibration from the computing device comprising the display at which the content item is being consumed.

Figure 11:
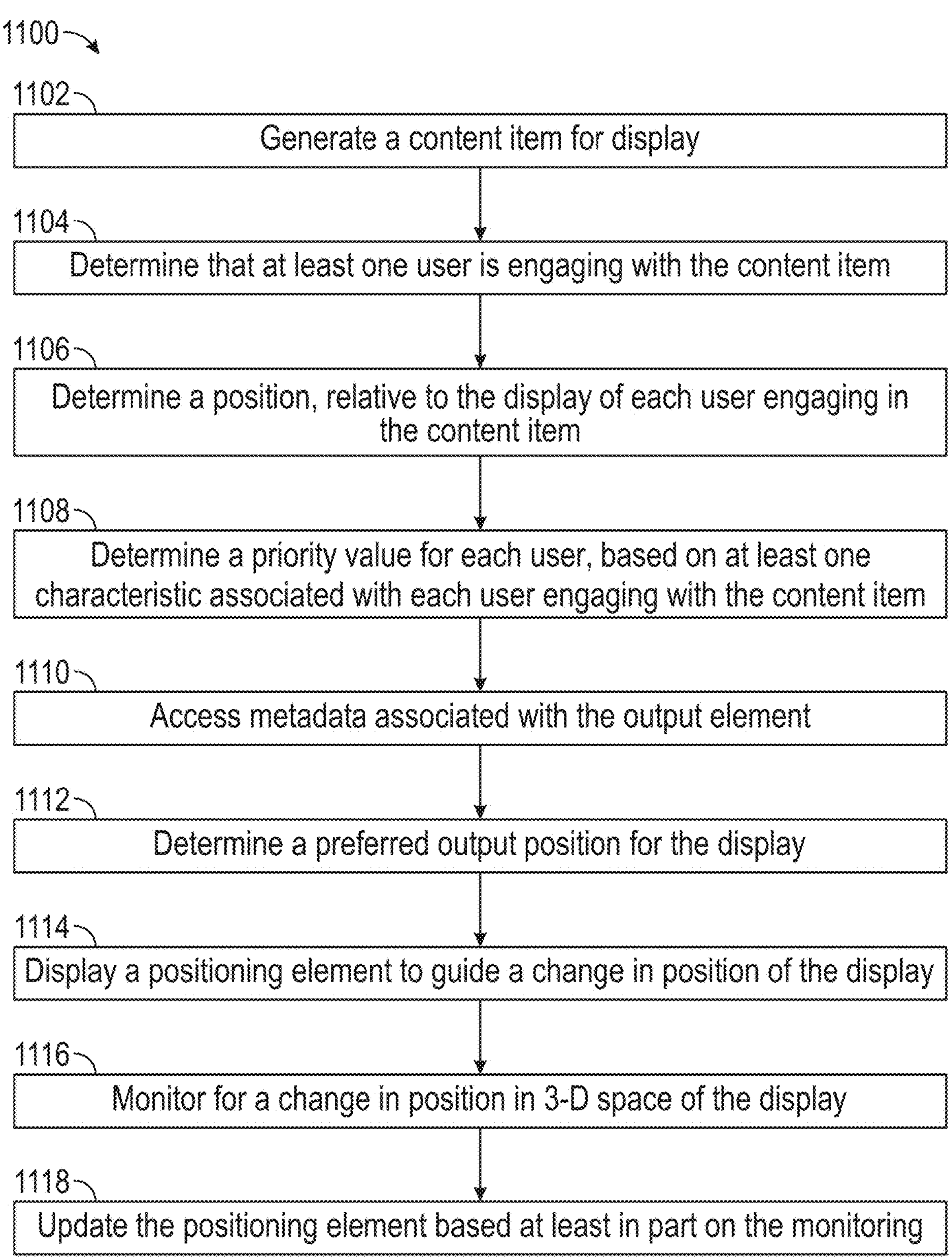
FIG. 11 is a flowchart of illustrative steps for enabling improved content item output at a display, in accordance with some embodiments of the disclosure.

FIG. 11 is a flowchart of illustrative steps for enabling improved content item output at a display, in accordance with some embodiments of the disclosure. Process 1100 may be implemented, in whole or in part, on any of the computing devices mentioned herein. In addition, one or more actions of the process 1100 may be incorporated into or combined with one or more actions of any other processes or embodiments described herein.

At step 1102, a content item is generated for display, and, at step 1104, it is determined that at least one user is engaging with the content item. At step 1106, a position, relative to the display, of each user engaging in the content item is determined, and at step 1108, a priority value for each user is determined based on at least one characteristic associated with each user engaging with the content item. At step 1100, metadata associated with the output element is accessed, and, at step 1112, a preferred output position for the display is determined. At step 1114, a positioning element to guide a change in position of the display is displayed at the computing device, and, at step 1116, a change in position in 3D space of the display is monitored for. At step 1118, the positioning element is updated based at least in part on the monitoring.

Figure 12:
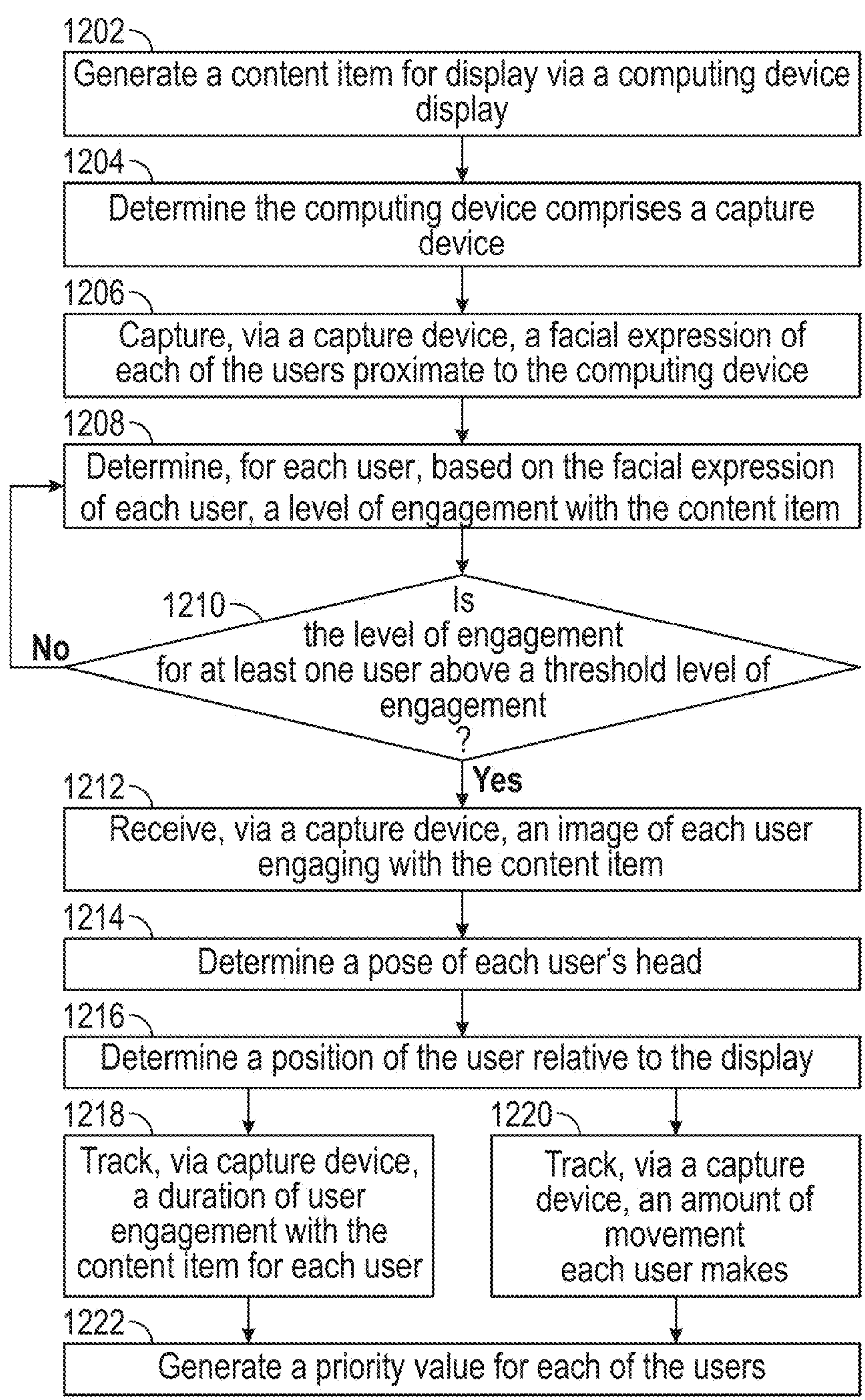
FIG. 12 is a flowchart of illustrative steps for enabling improved content item output via a capture device, in accordance with some embodiments of the disclosure.

FIG. 12 is a flowchart of illustrative steps for enabling improved content item output via a capture device, in accordance with some embodiments of the disclosure. Process 1200 may be implemented, in whole or in part, on any of the computing devices mentioned herein. In addition, one or more actions of the process 1200 may be incorporated into or combined with one or more actions of any other processes or embodiments described herein.

At step 1202, a content item is generated for display and, at step 1204, it is determined that the computing device comprises a capture device, such as a camera. At step 1206, a facial expression of each of the users proximate to the computing device is captured via the capture device. At step 1208, a level of engagement with the content item is determined for each user, based on the facial expression of each user. At step 1210, it is determined whether a level of engagement for at least one user is above a threshold level of engagement. If, at step 1210, it is determined that the level of engagement is not above the threshold level of engagement, the process loops around to step 1208. If, at step 1210, it is determined that the level of engagement is above the threshold level of engagement, the process proceeds to step 1212.

At step 1212, an image of each user engaging with the content item is received via the capture device, and, at step 1214, a pose of each user's head is determined. At step 1216, a position of the user relative to the display is determined. Steps 1218 and 1220 may be performed in parallel, series and/or only one of the steps may be performed. At step 1218, duration of user engagement with the content item for each user is tracked via the capture device, and, at step 1220, an amount of movement each user makes is tracked via the capture device. At step 1222, a priority value for each of the users is generated based on the tracking of steps 1218 and/or 1220.

Figure 13:
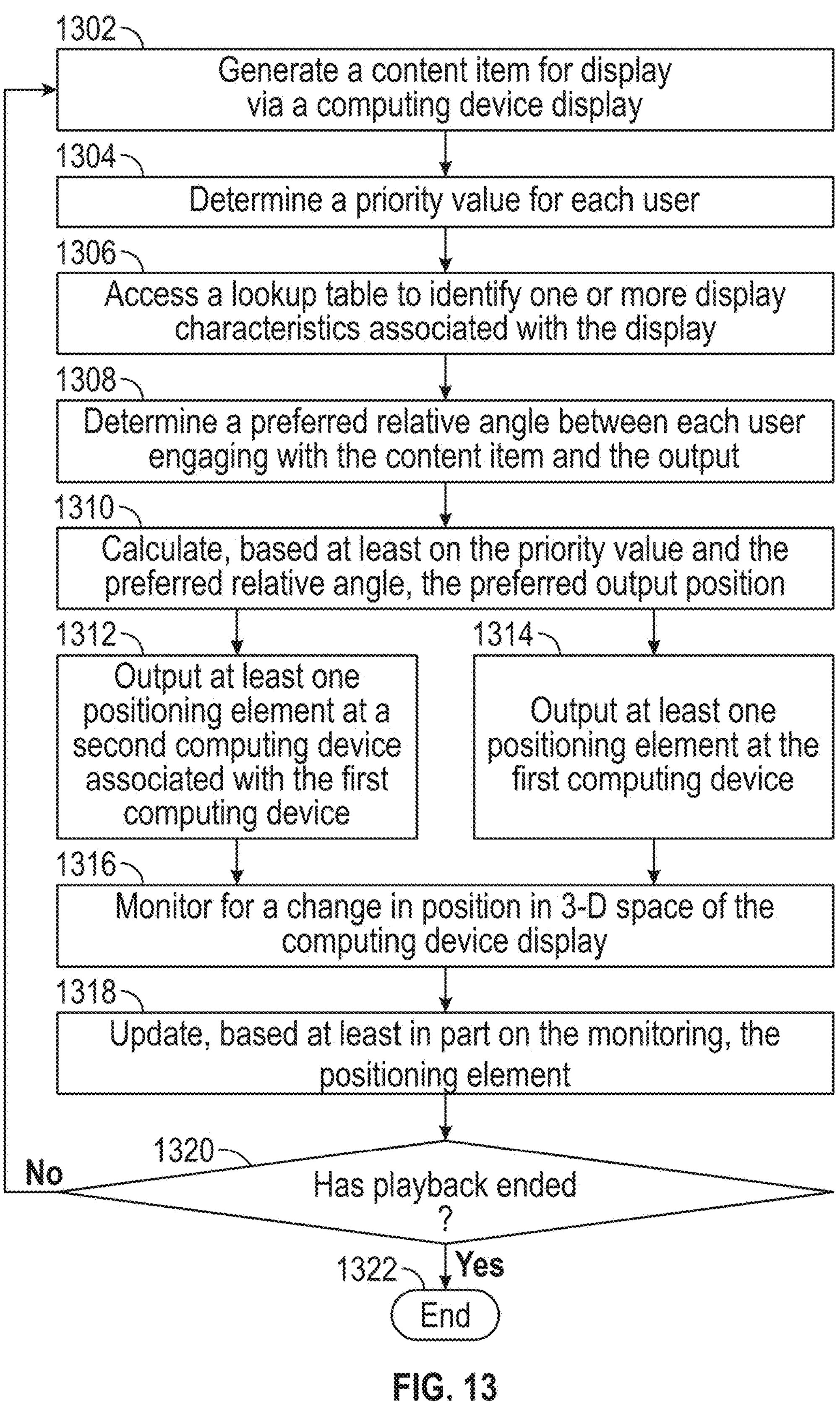
FIG. 13 is a flowchart of illustrative steps for enabling improved content item output, in accordance with some embodiments of the disclosure.

FIG. 13 is a flowchart of illustrative steps for enabling improved content item output, in accordance with some embodiments of the disclosure. Process 1300 may be implemented, in whole or in part, on any of the computing devices mentioned herein. In addition, one or more actions of the process 1300 may be incorporated into or combined with one or more actions of any other processes or embodiments described herein.

At step 1302, a content item is generated for display via a computing device display, and, at step 1304, a priority value for each user is determined. At step 1306, a lookup table is accessed to identify one or more display characteristics associated with the display, and at 1308, a preferred relative angle between each user engaging with the content item and the output is determined. At 1310, the preferred output position is calculated, based at least on the priority value and the preferred relative angle. Steps 1312 and 1314 may be performed substantially simultaneously. At step 1312, at least one positioning element is output at a second computing device associated with the first computing device, and, at step 1314, at least one positioning element is output at the first computing device. At step 1316, a change in position in 3D space of the computing device display is monitored for, and, at step 1318, the positioning element is updated based at least in part on the monitoring. At step 1320, it is determined whether playback of the content item has ended. If, at step 1320, it is determined that playback of the content item has not ended, then the process loops back to step 1302. If, at step 1320, it is determined that playback of the content item has ended, then the process proceeds to step 1322, where the process ends.

Figure 14:
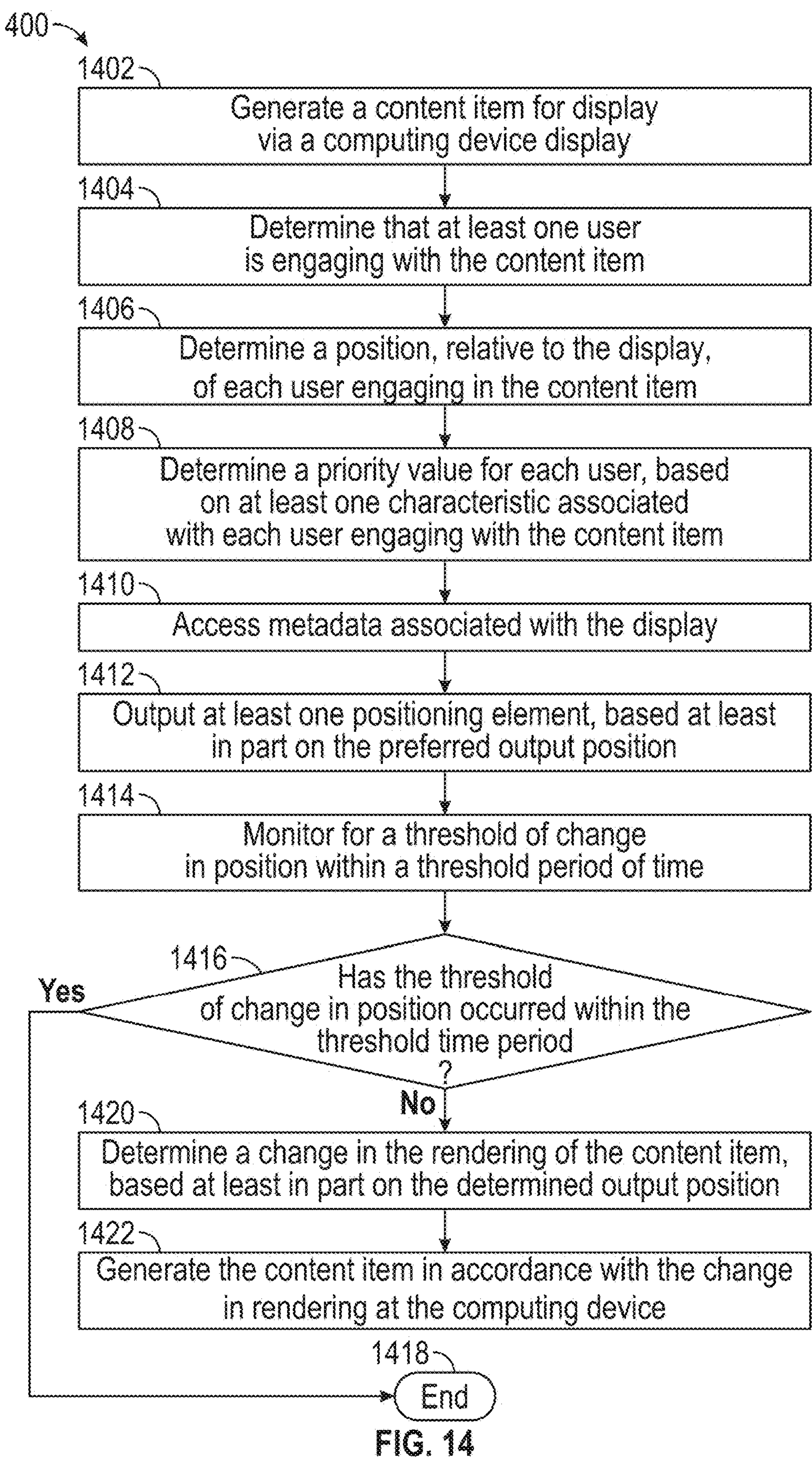
FIG. 14 is a flowchart of illustrative steps for enabling improved content item output at a speaker via rendering, in accordance with some embodiments of the disclosure.

FIG. 14 is a flowchart of illustrative steps for enabling improved content item output at a speaker via rendering, in accordance with some embodiments of the disclosure. Process 1400 may be implemented, in whole or in part, on any of the computing devices mentioned herein. In addition, one or more actions of the process 1400 may be incorporated into or combined with one or more actions of any other processes or embodiments described herein.

At step 1402, a content item is generated for display via a computing device display, and, at step 1404, it is determined that at least one user is engaging with the content item. At step 1406, a position of each user engaging in the content item is determined relative to the display, and, at step 1408, a priority value for each user is determined based on at least one characteristic associated with each user engaging with the content item. At step 1410, metadata associated with the display is accessed, and, at step 1412, at least one positioning element is output based at least in part on the preferred output position. At step 1414, a threshold of change in position of the computing device display within a threshold period of time is monitored for, and, at step 1416, it is determined whether the threshold of change in position occurred within the threshold time period.

If, at 1416, it is determined that the threshold of change in position has occurred within the threshold time period, then the process proceeds to step 1418, where it ends. If at 1416, it is determined that the threshold of change in position has not occurred within the threshold time period, then the process proceeds to step 1420. At step 1420, a change in the rendering of the content item is determined based at least in part on the determined output position, and, at step 1422, the content item is generated at the computing device in accordance with the change in rendering.

Figure 15:
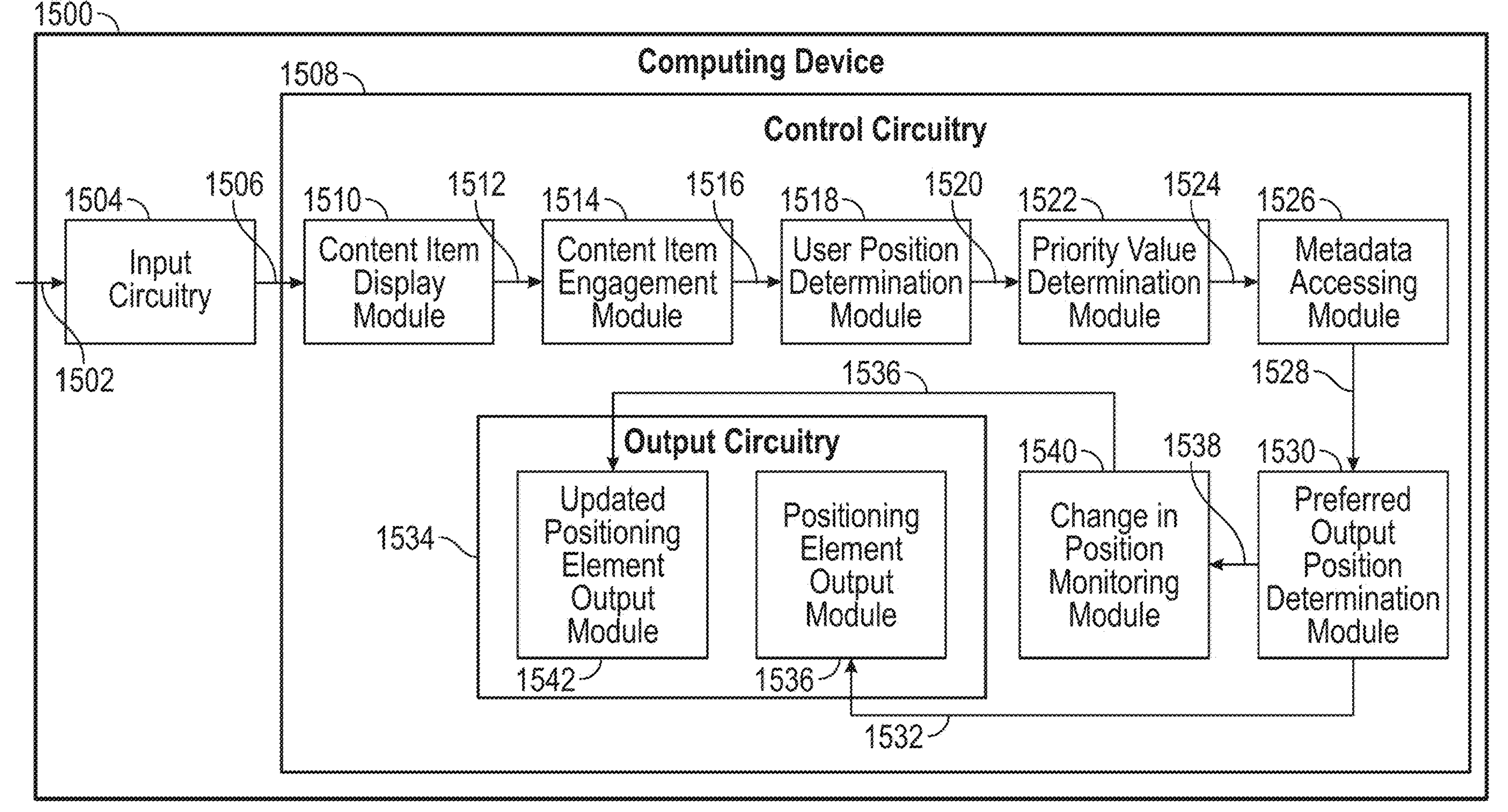
FIG. 15 is a block diagram representing components of a computing device and dataflow therebetween for enabling improved content item output, in accordance with some embodiments of the disclosure.

FIG. 15 is a block diagram representing components of a computing device and dataflow therebetween for enabling improved content item output, in accordance with some embodiments of the disclosure. Computing device 1500 comprises input circuitry 1504, control circuitry 1508 and output circuitry 1534. The computing device 1500 may be, for example, a laptop, a smartphone and/or a tablet. Control circuitry 1508 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

First input is received 1502 by the input circuitry 1504. The input circuitry 1504 is configured to receive inputs related to a computing device. For example, this input may be received via a touchscreen. In other examples, the input may be received via a keyboard and/or a mouse, an infrared controller, a Bluetooth and/or Wi-Fi controller of the computing device 1500, and/or a microphone. In some examples, this may be via a gesture detected via an extended reality device. In a further example, the input may comprise instructions received via another computing device. The input circuitry 1504 transmits 1506 the user input to the control circuitry 1508.

The control circuitry 1508 comprises a content item display module 1510, a content item engagement module 1514, a user position determination module 1518, a priority value determination module 1522, a metadata accessing module 1526, a preferred output position determining module 1530, a change in positioning module 1540 and output circuitry 1534 comprising a positioning element output module 1536 and an updated positioning element output module 1542.

The first input is transmitted 1506 to the content item display module 1510, where a received content item is output at a display associated with the computing device 1500. An indication that the content item is being output is transmitted 1512 to the content item engagement module 1514, where it is determined how many users are engaging with the content item. An indication of the number of users is transmitted 1516 to the user position determination module 1518, where positions of the determined users with respect to the display are determined. An indication of the user positions is transmitted 1520 to the priority value determination module 1522, where priority values are determined for each of the users. These positions and priority values are transmitted 1524 to the metadata accessing module 1526, where metadata associated with the display is accessed. The positions, priority values and metadata are transmitted 1528 to the preferred output position determination module 1530, where a preferred position of the display is determined. This preferred position is transmitted 1532 to the positioning element output module 1536, where one or more positioning elements are output at the computing device. An indication is also transmitted 1538 to the change in position monitoring module 1540, where a change in position of the computing device 1500 is monitored for. An indication of a change in position is transmitted 1536 to the updated positioning element output module 1542, where one or more updated positioning elements are output at the computing device.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

generating, for output via a display of a computing device, a content item;

determining that at least one user is engaging with the content item;

determining, for each of the at least one users that are engaging with the content item, a position of each user relative to the display;

determining, based at least in part on a characteristic associated with each of the at least one users engaging with the content item, a priority value for each of the at least one users;

accessing, at the computing device, metadata associated with the display;

determining, based at least in part on the priority value for the each of the at least one users and the metadata, a preferred output position for the display in three dimensional space;

displaying, at the display and based at least in part on the preferred output position, at least one positioning element configured to guide a change in a position of the display in three dimensional space;

monitoring, at the computing device, for the change in the position in three dimensional space of the display; and updating, based at least in part on the monitoring, the at least one positioning element.

2. The method of claim 1, wherein determining that the at least one user is engaging with the content item comprises determining that the at least one user is viewing the content item via the display.

3. The method of claim 2, wherein:

the monitoring comprises monitoring for a threshold change in position within a threshold time period; and the method further comprises:

determining that the threshold change in position has not occurred within the threshold time period;

determining, based at least in part on the determined output position, a change in rendering of the content item; and generating, for display at the computing device, the content item in accordance with the change in rendering.

4. The method of claim 3, wherein the change in rendering is at least one of a change in a scale of the content item, rotation of the content item or translation of the content item.

5. The method of claim 2, wherein the at least one positioning element comprises:

a first set of one or more user interface elements; and a second set of one or more user interface elements, wherein:

the second set of one or more user interface elements correspond to the first set of one or more user interface elements; and the second set of one or more user interface elements is offset from the first set of one or more user interface elements based at least in part on the determined output position.

6. The method of claim 1, wherein:

the computing device comprises a speaker;

generating the content item for output further comprises outputting the content item via the speaker;

accessing the metadata further comprises accessing metadata associated with the speaker;

determining that the at least one user is engaging with the content item comprises determining that the at least one user is listening to the content item via the speaker; and the method further comprises outputting at least one positioning instruction via the speaker.

7. The method of claim 1, wherein:

the computing device comprises a capture device;

determining that the at least one user is engaging with the content item comprises:

capturing, via the capture device, a facial expression of each of one or more users proximate to the computing device;

determining for each of the users proximate to the computing device, based on the respective captured facial expression, a level of engagement with the content item; and identifying that the level of engagement with the content item is above a threshold level of engagement.

8. The method of claim 1, wherein the characteristic comprises at least one of:

a time duration in which the user has been engaged with the content item;

an attention span of the user;

a movement of user; and an identity of the user.

9. The method of claim 1, wherein the determining the preferred output position for the display in three dimensional space comprises:

determining a preferred relative angle between each user of the at least one users and the display; and calculating, based at least in part on the priority value for each user and the preferred relative angle between each user and the display, the preferred output position.

10. The method of claim 1, wherein:

the computing device is a first computing device; and the method further comprises outputting positioning instructions at a second computing device associated with the first computing device.

11. The method of claim 1, wherein:

the computing device comprises a capture device; and the determining that at least one user is engaging with the content item comprises:

receiving, via the capture device, at least one image of the at least one user; and determining, based at least in part on the at least one image of the user, that a direction of the user's eyes corresponds to the user viewing the content item.

12. The method of claim 1, wherein:

the computing device comprises a capture device; and the determining the position of each user relative to the display comprises:

receiving, via the capture device and for each user, at least one image of the user;

determining, based at least in part on the at least one image of the user, a pose of the user's head; and determining, based at least in part on the determined pose, a position of the user.

13. The method of claim 1, wherein:

the computing device comprises a capture device;

the characteristic is a duration of user engagement with the content item; and determining the priority value for each of the at least one users comprises:

tracking, via the capture device and for each user of the at least users, the duration of user engagement with the content item; and generating, based at least in part on the duration of the user engagement with the content item, a priority value for each of the users, wherein a higher priority value is associated with a longer duration of user engagement.

14. The method of claim 1, wherein the characteristic is an identity associated with each of the users, and determining the priority value for each of the at least one users comprises:

determining, for each of the at least one users, the identity associated with each of the users;

identifying, based at least in part on the identify of each of the users, that a user profile associated with one of the at least one users is logged in at the computing device;

receiving a weighting for each of the other users of the at least one users who are not logged in at the computing device; and generating, based at the user who is logged in at the computing device and the received weighting for each of the other users, a priority value for each of the users, wherein a highest priority value is associated with the users logged in at the computing device, and the other priority values are based at least in part on the received weightings.

15. The method of claim 1, wherein:

the computing device comprises a capture device;

the characteristic is an amount of user movement; and determining the priority value for each of the at least one users comprises:

tracking, via the capture device and for each user of the at least users, an amount of user movement; and generating, based at least in part on the determined user movement, a priority value for each of the users, wherein a higher priority value is associated with a lower amount of user movement.

16. The method of claim 1, wherein:

the computing device comprises a capture device;

the characteristic is an amount of user attention to the content item; and determining the priority value for each of the at least one users comprises:

tracking, via the capture device and for each user of the at least users, the amount of user attention to the content item; and generating, based at least in part on the determined amount of user attention, a priority value for each of the users, wherein a higher priority value is associated with a higher amount of user attention.

17. The method of claim 1, wherein accessing the metadata comprises accessing a lookup table to identify one or more display characteristics associated with the display.

18. The method of claim 1, wherein determining the preferred position comprises:

calculating a position of the display that gives a viewing angle that is closest to the optimal viewing angle to the display for each of the at least one users;

determining that the display cannot be positioned to give an optimal viewing angle for all users of the at least one users; and determining the positioning of the display so that a user associated with a higher priority value has a viewing angle that is closer to the optimal viewing angle than a user associated with a lower priority value.

19. A system comprising:

input/output circuitry configured to:

generate, for output via a display of a computing device, a content item; and processing circuitry configured to:

determine that at least one user is engaging with the content item;

determine, for each of the at least one users that are engaging with the content item, a position of each user relative to the display;

determine, based at least in part on a characteristic associated with each of the at least one users engaging with the content item, a priority value for each of the at least one users;

access, at the computing device, metadata associated with the display;

determine, based at least in part on the priority value for the each of the at least one users and the metadata, a preferred output position for the display in three dimensional space;

display, at the display and based at least in part on the preferred output position, at least one positioning element configured to guide a change in a position of the display in three dimensional space;

monitor, at the computing device, for the change in the position in three dimensional space of the display; and update, based at least in part on the monitoring, the at least one positioning element.

20. The system of claim 19, wherein the processing circuitry configured to determine that the at least one user is engaging with the content item is configured to determine that the at least one user is viewing the content item via the display.

* * * * *